No. 728,397. Patented May 19, 1903.

UNITED STATES PATENT OFFICE.

THOMAS B. JOSEPH, OF SALT LAKE CITY, UTAH.

GOLD-EXTRACTING PROCESS.

SPECIFICATION forming part of Letters Patent No. 728,397, dated May 19, 1903.

Application filed September 10, 1902. Serial No. 122,794. (No specimens.)

*To all whom it may concern:*

Be it known that I, THOMAS B. JOSEPH, a citizen of the United States, residing at Salt Lake City, in the county of Salt Lake and State of Utah, have invented certain new and useful Improvements in Gold - Extracting Processes; and I do declare the following to be a full, clear, and exact description of the invention, such as will enable others skilled in the art to which it appertains to make and use the same.

My invention relates to the extraction of precious metals, but more particularly to gold; and has for its object to extract gold from ore containing the same when in a suitable condition.

A further object of my invention is to provide a process for extracting precious metals which can be used on base ore and which will not be neutralized by the presence of arsenic or sulfur and which will leach both roasted and unroasted ore.

It must be understood that I cannot state definitely how fine the ore should be crushed, as loose sand-ore should be leached in its natural state, while soft ores should not be crushed as fine as hard or base ores, the process of crushing depending entirely upon the quality, impenetrability, and hardness of the ore to be leached.

In carrying out my process after the ore has been crushed, as aforesaid, I subject the same to the leaching action of a diluted solution composed of water, cyanid of potassium, hydrate of calcium, liquefied carbon dioxid or carbonic-acid gas and peroxid of barium, in conjunction with compressed air conveyed therein through the bottom from an air-compressor. About three ounces of the peroxid-of-barium dust to the ton of the solution is dissolved in the leaching solution while the latter is in the storage-tank before running into the ore-leaching tank, although ores containing much free sulfur need more peroxid of barium, as it combines with the sulfur in the solution forming the insoluble sulfate of barium, thus preventing the sulfur from combining with the potassium of the cyanid of potassium and from injuring the cyanids of the precious metals. The peroxid of barium decomposes in the solution and liberates its oxygen, thereby aiding the cyanogen in its work.

In carrying out my process such vessels which have been found to be most practical in the extraction of gold are used, although I prefer those made of wood, as metal will be more or less subject to the chemical action of the leaching solution, and I prefer to have the storage-tank standing at one side at a higher elevation than the ore-leaching tank, so that the leaching solution will run by the force of gravity into the tank containing the ore, which tank can be either a stationary one or one that can be revolved as a barrel to agitate the ore, which revolving cylindrical barrel might also contain a few pounds pressure of air forced therein to assist the cyanogen in the extraction of the precious metals. When the liquefied carbon dioxid is used, the same is either admitted to the storage-tank or mixed in the leaching-tank containing the ore. It is preferable, however, to admit it to the storage-tank after the peroxid of barium has been dissolved therein. The compressed air is conveyed into the tank of ore to be leached through the bottom of the tank for the purpose of agitating the ore, and care must be taken not to admit the air under too great pressure, as channeling will result, which will retard the leaching of the ore. The carbonic-acid gas in the solution neutralizes to a great extent the too strong alkalinity of the solution as well as the injurious gases of sulfur from the ore, which gases tend to retain the gold and retard the leaching. It also helps to hold the soluble lime in suspension and keeps it from being precipitated, while the hydrate of calcium in the solution helps to neutralize ore acids which would otherwise be injurious to the cyanid of potassium, and thus tend to retain the precious metal in the ore. The hydrate of calcium in the solution will, moreover, form an insoluble compound with some of the arsenic in the ore and neutralize its injurious effects as well as the injurious effects of sulfur. I have found that the use of carbonic-acid gas is of much more value in this connection than the bicarbonates of potassium, sodium, or ammonium, for the reason that too much of the alkali of these metals would dissolve some of the base ores, which would be injurious to the solution. The carbonic-acid gas in the solution materially assists the cyanid of potassium in extracting gold from the ore, and the presence of hydrate of calcium makes it possible to leach some of the unroasted ores containing arsenic or sulfur by cyanid of potassium, while the peroxid of barium forms an insoluble compound with sulfur, thus preventing the cyanogen liberated therefrom from the injurious effects of any free sulfur. Where there is hydrate of lime in the solution, a part of the lime would combine with any soluble arsenic and form an insoluble compound of lime and arsenic making arseniate of lime.

After draining the metal-saturated solution from the tank of ore a wash-water should be run through the tank of ore in order to wash out most of the gold solution which may have been retained in the leaching-tank. This wash-water after being drained from said tank is pumped back into a storage-tank to replenish the leaching solution.

The carbonic-acid gas to be used in my solution can be obtained from any well-known source, or coal-smoke may be conveyed through a grate containing lumps of limestone upon which a small spray of water is being played. This would extract the sulfur from the smoke, after which the smoke is conveyed into the leaching solution. Were it not for the hydrate of calcium and oxygen in the solution, some of the ores would have to be roasted, which would make the process much more expensive and detract from the value of the same.

I wish to be fully understood as distinguishing between the use of hydrate of calcium and oxid of lime and lay no claim to the latter, for the reason that the dissolving of the same into hydrate of calcium in the leaching liquor is so slow that the arsenic or sulfur in the arsenical or sulfid ores has injured the cyanid of potassium before the oxid of lime is dissolved, thus rendering its use of little or no value, whereas when the hydrate of calcium is thoroughly mixed with the leaching liquor before the same is run onto the ore to be leached the hydrate of calcium immediately neutralizes most of the baseness of the ore.

After the ore is leached the solution is drained off into a sump-tank, where the gold is extracted by any well-known process, although I prefer to precipitate the gold by the use of zinc-dust. The leaching liquor can then be pumped back into the storage-tank and be strengthened. In this way the solution may be used over and over again, the pipes connecting the different tanks being provided with stop-cocks, so as to control and regulate the flow of the leaching liquor.

What I claim as my invention, and desire to secure by Letters Patent of the United States, is—

1. The herein-described process of extracting gold and silver from ore containing the same when in a suitable condition, which consists in subjecting the said ore to the leaching action of a solution of water, cyanid of potassium, hydrate of calcium, peroxid of barium and carbonic-acid gas, said gas being forced into the leaching solution simultaneously with compressed air.

2. The herein-described process of extracting gold and silver from ore containing the same when in a suitable condition, which consists in subjecting the said ore to the leaching action of a solution of water, cyanid of potassium, hydrate of calcium, peroxid of barium and carbonic-acid gas, and subsequently precipitating the gold from the solution.

3. The herein-described process of extracting gold and silver from ore containing the same when in a suitable condition, which consists in subjecting the said ore to the leaching action of a solution of water, cyanid of potassium, peroxid of barium and carbonic-acid gas, and subsequently precipitating the gold from the solution.

4. The herein-described process of extracting gold and silver from ore containing the same when in a suitable condition, which consists in subjecting the said ore to the leaching action of a solution of water, cyanid of potassium, hydrate of calcium, peroxid of barium and carbonic-acid gas, the ore being agitated by compressed air.

5. The herein-described process of extracting gold and silver from ore containing the same when in a suitable condition, which consists in subjecting the said ore to the leaching action of a solution of water, cyanid of potassium, hydrate of calcium and peroxid of barium the ore being agitated by compressed air.

6. The herein-described process of extracting gold and silver from ore containing the same when in a suitable condition, which consists in subjecting the said ore to the leaching action of a solution of water, cyanid of potassium, hydrate of calcium and peroxid of barium.

In testimony whereof I affix my signature in presence of two witnesses.

THOMAS B. JOSEPH.

Witnesses:
ELLA PATTEN,
M. L. RITCHIE.